(12) United States Patent
Rao et al.

(10) Patent No.: US 12,561,315 B2
(45) Date of Patent: Feb. 24, 2026

(54) METHODS AND SYSTEMS FOR RESPONDING TO QUERIES

(71) Applicant: Adeia Guides Inc., San Jose, CA (US)

(72) Inventors: Shrisha Rao, Bangalore (IN); Gyanveer Singh, Bangalore (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/135,410

(22) Filed: Apr. 17, 2023

(65) Prior Publication Data

US 2024/0346018 A1 Oct. 17, 2024

(51) Int. Cl.
| | |
|---|---|
| *G06F 7/00* | (2006.01) |
| *G06F 16/21* | (2019.01) |
| *G06F 16/242* | (2019.01) |
| *G06F 16/2452* | (2019.01) |

(52) U.S. Cl.
CPC ........ *G06F 16/2425* (2019.01); *G06F 16/219* (2019.01); *G06F 16/24524* (2019.01)

(58) Field of Classification Search
CPC ............... G06F 16/2425; G06F 16/219; G06F 16/24524; G06F 16/27; G06F 16/2453; G06F 16/2455; G06F 16/2282
See application file for complete search history.

(56) References Cited

U.S. PATENT DOCUMENTS

| | | | | |
|---|---|---|---|---|
| 11,838,262 | B1 * | 12/2023 | Kangas | .................. H04L 61/09 |
| 2018/0338226 | A1 * | 11/2018 | Bendi | .................. H04L 67/025 |
| 2019/0102459 | A1 * | 4/2019 | Patterson | .............. G06F 40/295 |
| 2019/0114327 | A1 * | 4/2019 | Yeh | ................... G06F 16/24522 |
| 2019/0114359 | A1 * | 4/2019 | Yeh | ..................... G06F 16/3329 |

OTHER PUBLICATIONS

Srihari, V., et al., "Handling Complex Queries Using Query Trees," TechRxiv, 1-32 (2021).

* cited by examiner

*Primary Examiner* — Mohammad A Sana

(74) *Attorney, Agent, or Firm* — HG Law LLP

(57) ABSTRACT

Systems and methods are described for receiving a query of a user. A first portion of the query is identified for which resolution is dependent on access to data of a third party. A connection type between the user and the third party is determined. In response to the connection type being of a predetermined type, access to the data of the third party is provided. The data of the third party is retrieved. The first portion of the query is resolved using the data of the third party.

19 Claims, 11 Drawing Sheets

300

| Receive a user query | —— 302 |

| Identify a first portion of the query for which resolution is dependent on access to third-party data | 304 —— |

| Determine a connection type between a user and a third party | —— 306 |

308 —— | Provide access to the third-party data |

| Retrieve the third-party data | —— 310 |

312 —— | Resolve the first portion of the query using the third-party data |

300

Receive a user query — 302

304 — Identify a first portion of the query for which resolution is dependent on access to third-party data Determine a connection type between a user and a third party — 306

308 — Provide access to the third-party data

Retrieve the third-party data — 310

312 — Resolve the first portion of the query using the third-party data

METHODS AND SYSTEMS FOR RESPONDING TO QUERIES

BACKGROUND

The present disclosure relates to methods and systems for responding to queries. Particularly, but not exclusively, the present disclosure relates to providing secure access to private data of a third party when it is required in order to respond a user's query.

SUMMARY

When a user runs a query, a query engine processing the query may need data from multiple data sources to resolve the query. The data sources may include a public data source, a private data source of the user making the query, and a private data source of a third party. For example, a "user" may be a person or entity which is running a complex query using the query engine. Public data is any data which is widely available to all parties, such as public web pages, data collected by search engines, etc. Private data of the user is the data that is specifically related to the user and restricted against access by any other entity. Such private data may be accumulated within a user's device or user account and may not be available to any other entity without the consent of the user. A "third party" is another user (e.g., an individual or an organization) that also possesses private data that may be relevant for resolving/answering the user's query. In order to process certain types of queries, it may be necessary for the query engine to have access to private data belonging to the user and/or the third party.

Systems and methods are provided herein for responding to a query by enabling access to private data. For example, a user may issue a query (a "user query") to a device, such as user equipment having a virtual assistant, the user query requiring access to private data in order to resolve at least a portion of the query. For example, a user may issue a query requesting to know the location of a third party, such as a family member. The systems and methods provided herein may be used to respond to the user query by accessing private data of the third party based on conditional access rights to the third-party data.

According to the systems and methods described herein a query of a user (i.e., a user query) may be received. A first portion of the query is identified for which resolution is dependent on access to data of a third party (i.e., third-party data). A connection type between the user and the third party is determined. For example, it may be determined whether the user is a friend and/or a family member of the third party. In response to the connection type being of a predetermined type, access to the data of the third party is provided. The data of the third party is retrieved. The first portion of the query is resolved using the data of the third party.

According to the systems and methods described herein a query of a user (i.e., a user query) may be received. A first portion of the query is identified for which resolution is dependent on access to data of a third party (i.e., third-party data). A category of the third-party data is determined. For example, it may be determined whether the third-party data relates to a location of the third party, or financial data of the third party, places visited while on vacation, restaurants, food orders, etc. In response to the category being of a predetermined category, access to the data of the third party is provided. The data of the third party is retrieved. The first portion of the query is resolved using the data of the third party.

In some examples, an intent of the query may be determined, e.g., using existing automatic speech recognition and/or natural language processing techniques.

In some examples, the third party may configure metadata that defines access parameters of the data of the third-party. The metadata may comprise information relating to the purpose for which the third party data may be used. The metadata defining the access parameters of the data of the third party may be retrieved. The data of the third party may be processed according to the access parameters, e.g., after resolving the first portion of the query, or the entire query.

In some examples, in response to the connection type not being of the predetermined type, a permission request actionable by the third party may be generated. In some examples, in response to the category not being of the predetermined category, a permission request actionable by the third party may be generated. In response to receiving permission of the third party, access to the data of the third party may be provided.

In some examples, in response to the connection type not being of the predetermined type, one or more historic interactions between the user and the third party may be determined. In some examples, in response to the category not being of the predetermined category, one or more historic interactions between the user and the third party may be determined. In some examples, it may be determined whether the one or more historic interaction comprise the data of the third party, e.g., to determine if the user and the third party have shared private data previously that can be used to provide a response to the query. In some examples, in response to determining that the historic interaction comprise the data of the third party, access to the data of the third party may be provided. In some examples, sharing of private data based on a connection type and/or a category may be overridden based on whether the private data has been shared previously.

In some examples, multiple dataspaces and/or domains may be generated. A dataspace may be defined as a decentralized infrastructure for trustworthy data sharing and exchange in data ecosystems, based on commonly agreed principles. In some examples, each dataspace may be associated with one or more predetermined connection types and/or one or more predetermined categories. In some examples, the data of the third party may be assigned to the one or more dataspaces (e.g., using a machine learning data classification model). In some examples, in response to the connection type between the user and the third party being of the predetermined type, access to the dataspace may be provided. In some examples, in response to the category being of the predetermined category, access to the dataspace may be provided. In some examples, assigning the data of the third party to the one or more dataspaces may be based on a category of the data of the third party.

In some examples, the data of the third party may be aggregated from multiple third-party data sources, e.g., using a machine learning classification model to classify private data collected from various applications into different dataspaces.

In some examples, a type and/or an identity of an application, e.g., query engine, that received the user query may be determined. In some examples, in response to the application type being of a predetermined application type (e.g., authorized query engine), access to the data of the third party may be provided. In some examples, in response to the identity of the application being of a predetermined application identity (e.g., authorized query engine), access to the data of the third party may be provided.

In some examples, determining the connection type between the user and the third party comprises at least one of: determining a social media connection between the user and the third party; or determining a communication frequency between the user and the third party.

In some examples, a second portion of the query for which resolution is not dependent on access to the data of the third party may be identified. It may be determined whether resolution of the second portion of the query is dependent on resolution of the first portion of the query. In some examples, resolution of the first portion of the query is prioritized when the resolution of the second portion of the query is dependent on resolution of the first portion of the query.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
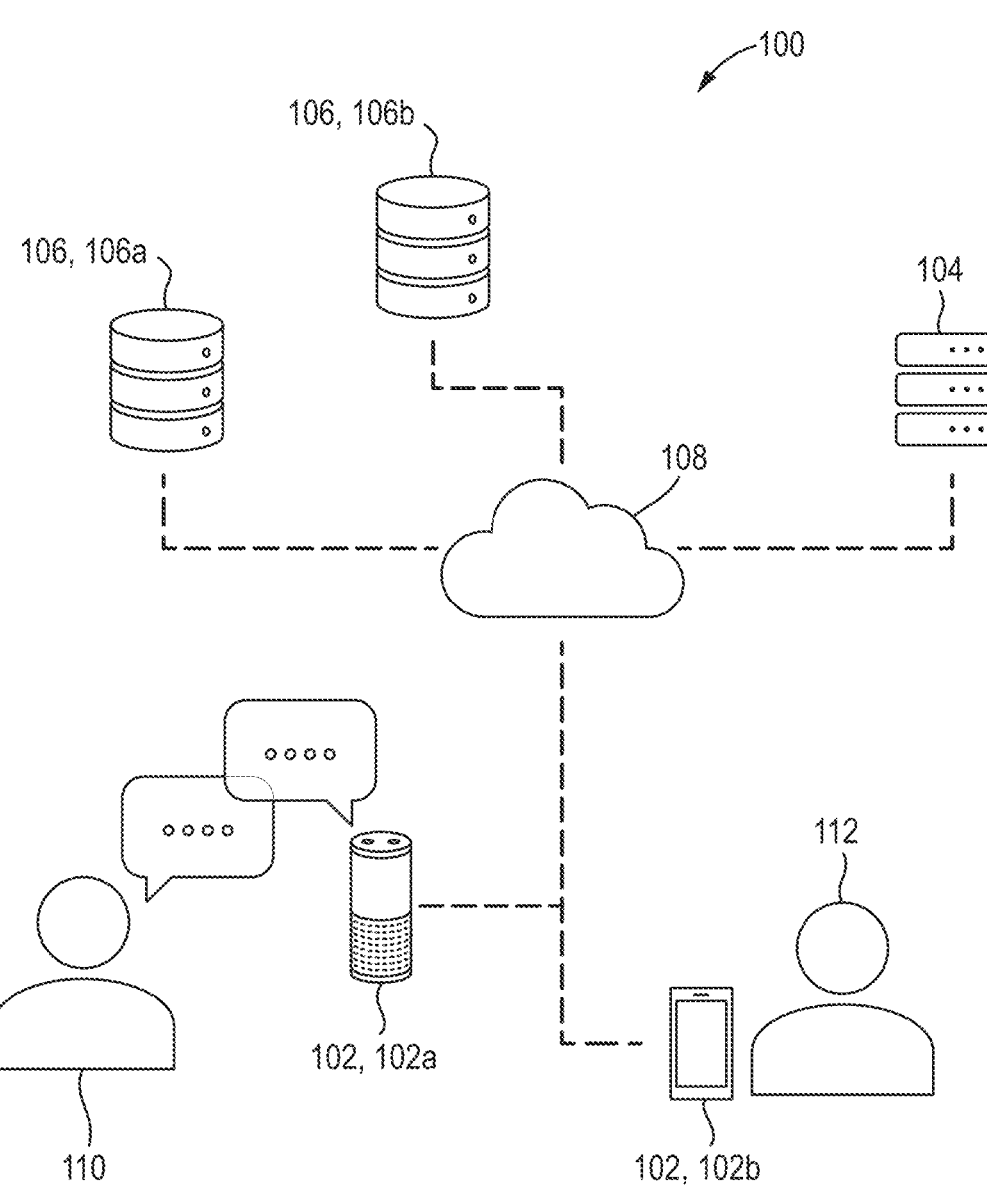
FIG. 1 illustrates an overview of the system for responding to queries, in accordance with some examples of the disclosure.

FIG. 1 illustrates an overview of a system 100 for responding to a query. The example shown in FIG. 1 illustrates a user 110 interacting with a user device 102, e.g., a client device, having a virtual assistant (VA) with which the user 110 can interact, e.g., by issuing voice commands. However, the user device 102 may be any appropriate type of user device 102 configured to receive a command or query from a user, such as a smartphone or tablet using voice and/or text inputs. In the example shown in FIG. 1, the user device 102 is configured to provide a response to the query of user 110. However, the response may be provided by any other appropriate user device 102, in addition to or alternatively from being provided by the user device 102. For example, a user may issue a query to a voice assistant and receive a response to the query at another user device 102, such as a text message on a smartphone. For the sake of conciseness, the examples disclosed herein refer to the interaction between user 110 and the VA of user device 102, but it is understood that the invention is not limited to such an implementation. For the avoidance of doubt, a VA is a software agent that can perform tasks or services for a user based on commands or questions. The VA may typically operate in conjunction with one or more VA services, and, in some cases, further applications such as third party applications, in order to perform the tasks or services. Herein, a VA may receive commands or questions from a user, and verbally (or otherwise) respond to a user, where the commands or questions are be processed by a VA service operated by a server device.

In the example shown in FIG. 1, user device 102 is communicatively coupled to a server 104 and at least one database 106, e.g., via network 108. In this manner, the user device 102 provides user 110 with access to VA (cloud) services, e.g., a query engine, provided by an operator of server 104, which can retrieve data from one or more databases for responding to a user's query.

In some cases, a VA service may require access to various types of data in order to fully resolve a query. For example, the VA service may require access to private data, either of user 110 or a third party, e.g., third party 112. For example, user 110 may issue a query such as: i) "Book the resort where Jason stayed during his recent trip to San Jose", or ii) "Reorder the Thai curry from the same restaurant that my wife ordered from on our last anniversary". In order for the VA service to provide a response to these queries, the VA service needs to access the user's private data and/or the third party's private data. A conventional query engine may fail to resolve these queries in the absence of the private data. For example, a conventional query engine may not have authorization to access a database containing the private data required to resolve the query. Even if a conventional query engine did have access to the private data, such access would require access controls in order to meet data privacy standards. Referring to the above example queries, the VA service needs to resolve: for query i) who Jason is, which requires access to the private data of user 110, and where Jason stayed, which requires access to the private data of Jason, i.e., third party 112; and for query ii) when the user's anniversary is, which requires access to the private data of user 110 and/or third party data of the user's wife, from which restaurant the user's wife ordered the curry, which requires access to the private data of the user's wife, i.e., third party 112, and which type of curry was ordered, which requires access to the private data of the user's wife and/or the private data of the restaurant.

In the example shown in FIG. 1, the user 110 and the third party 112 are associated with respective user devices 102, e.g., VA device 102a and smartphone 102b. For the avoidance of doubt, each user device 102 may be a physical electronic device. Example user devices 102 include TVs, laptops, head-mounted displays, mobile phones, wearable devices (e.g., smart watches), and/or any other appropriate user device 102 configured to receive a user input and/or provide a reply to a user query.

In the example shown in FIG. 1, VA device 102a is configured to receive a query from user 110. Using one of the above examples, user 110 may issue the query "Book the resort where Jason stayed during his recent trip to San Jose". VA device 102a may transmit the query to a VA service operated by server 104. At server 104, the query is processed and broken down into sub-queries. For example, the VA service may use dependency parsing and query tree generation to create one or more sub queries based on the query received from VA device 102*a*. For example, the query "Book the resort where Jason stayed during his recent trip to San Jose" may be broken down into a first sub-query "Where did Jason stay during his recent trip to San Jose?" and a second query "Book the [resort=the answer to the first sub query]". Following the creation of the sub-queries, the VA service tags each sub-query as either requiring private or non-private data for resolution of the sub-query. For example, resolution of the first sub-query requires access to Jason's private data, e.g., Jason's calendar, while resolution of the second sub-query can use public data, e.g., a booking system for the resort. Further details on the processing of the user query is provided below in relation to FIGS. 3 and 5.

In order to resolve the first query, the VA service requests access to Jason's private data. For example, the VA service may issue an access request to Jason's user device 102*b*. Access to Jason's private data may be given according to one or more access configurations set by Jason. For example, Jason may configure user device 102*b* to provide access to his private data based on a connection type between him and user 110. For example, Jason may configure a system component of user device 102*b* to provide access to requests issued by a first connection type, e.g., a family member or close friend, but not by other connection types, such as colleagues or other third partis. In response to, the connection type between the user 110 and Jason being of the first type (or another allowable connection type), user device 102*b* provides access to Jason's private data, e.g., calendar data stored on database 106*b*. For example, upon being provided access, VA service may determine that Jason stayed at the Hotel De Anza during his most recent trip to San Jose. In some examples, access to the private data may be conditional. For example, system component of user device 102*b* may provide metadata to VA service indicating one or more conditions pertaining to access of the private data, such as for what purpose the private data may be used, for how long access to the private data is granted, and one or more indicating how the private data is to be handled after resolving the sub-query. In some examples, access to Jason's private data may be based on a category of the private data. For example, Jason may configure a system component to allow access to one or more predetermined categories of private data, such as calendar data, e.g., in combination with allowing access based on the connection type.

Following resolution of the first sub-query, VA service can resolve the second sub-query by using the answer to the first sub-query (Resort=Hotel De Anza) in the second sub-query. In this manner, the second sub-query can be resolved, e.g., using a public booking system for the hotel stored on database 106*a*, in response to the conditional access to Jason's private data, stored on database 106*b*, granted by the system component of user device 102*b*. Further details of this methodology for resolving a complex query using private and non-private data are provided below, e.g., in relation to the processes depicted in FIG. 4, implanted by example system 100 of FIG. 1 and/or system 200 of FIG. 2.

Figure 2:
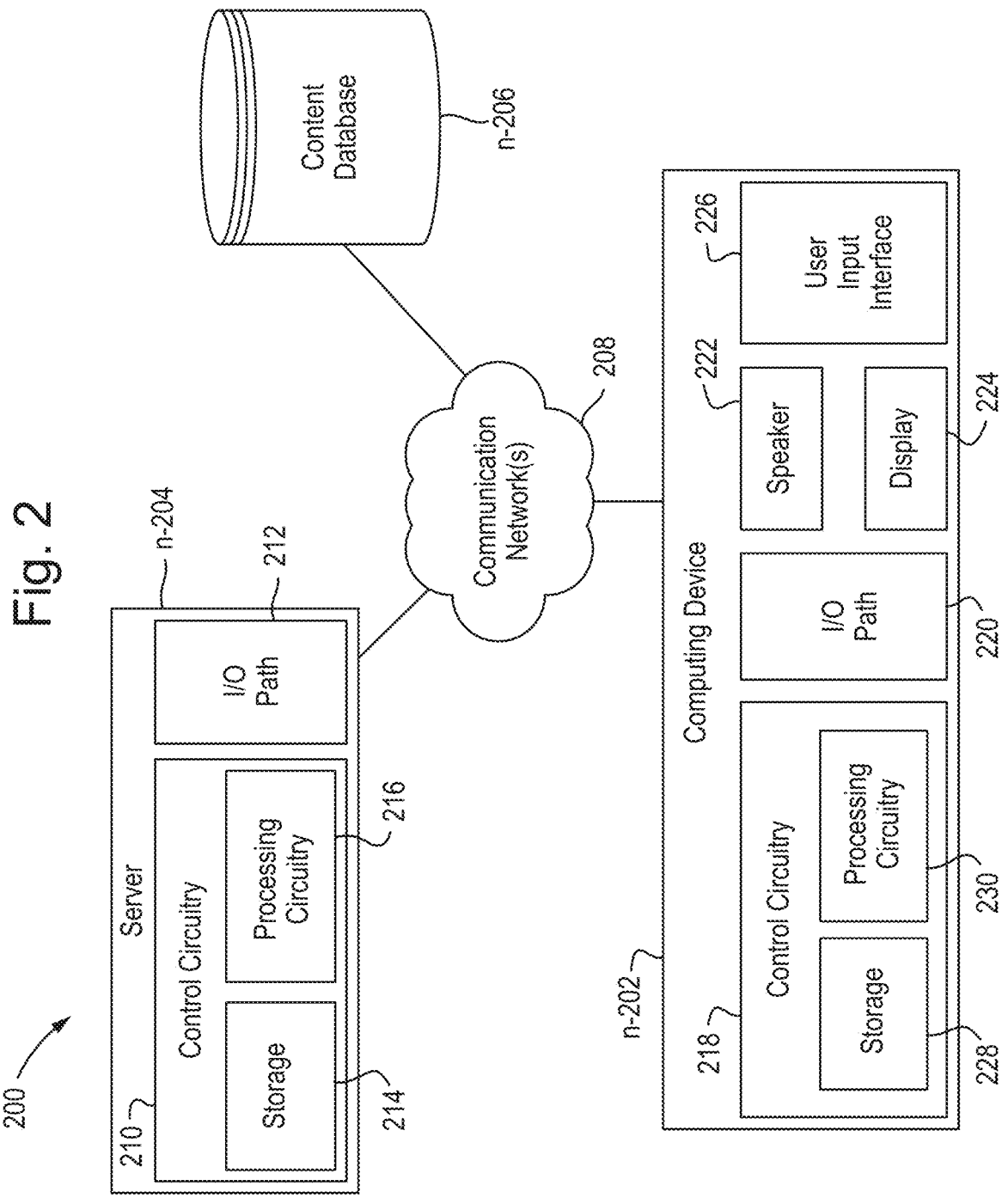
FIG. 2 is a block diagram showing components of an example system for responding to queries, in accordance with some examples of the disclosure.

FIG. 2 is an illustrative block diagram showing example system 200, e.g., a non-transitory computer-readable medium, configured to generate subtitles. Although FIG. 2 shows system 200 as including a number and configuration of individual components, in some examples, any number of the components of system 200 may be combined and/or integrated as one device, e.g., as user device 102. System

200 includes computing device n-202 (denoting any appropriate number of computing devices, such as user device 102), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to generate subtitles, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
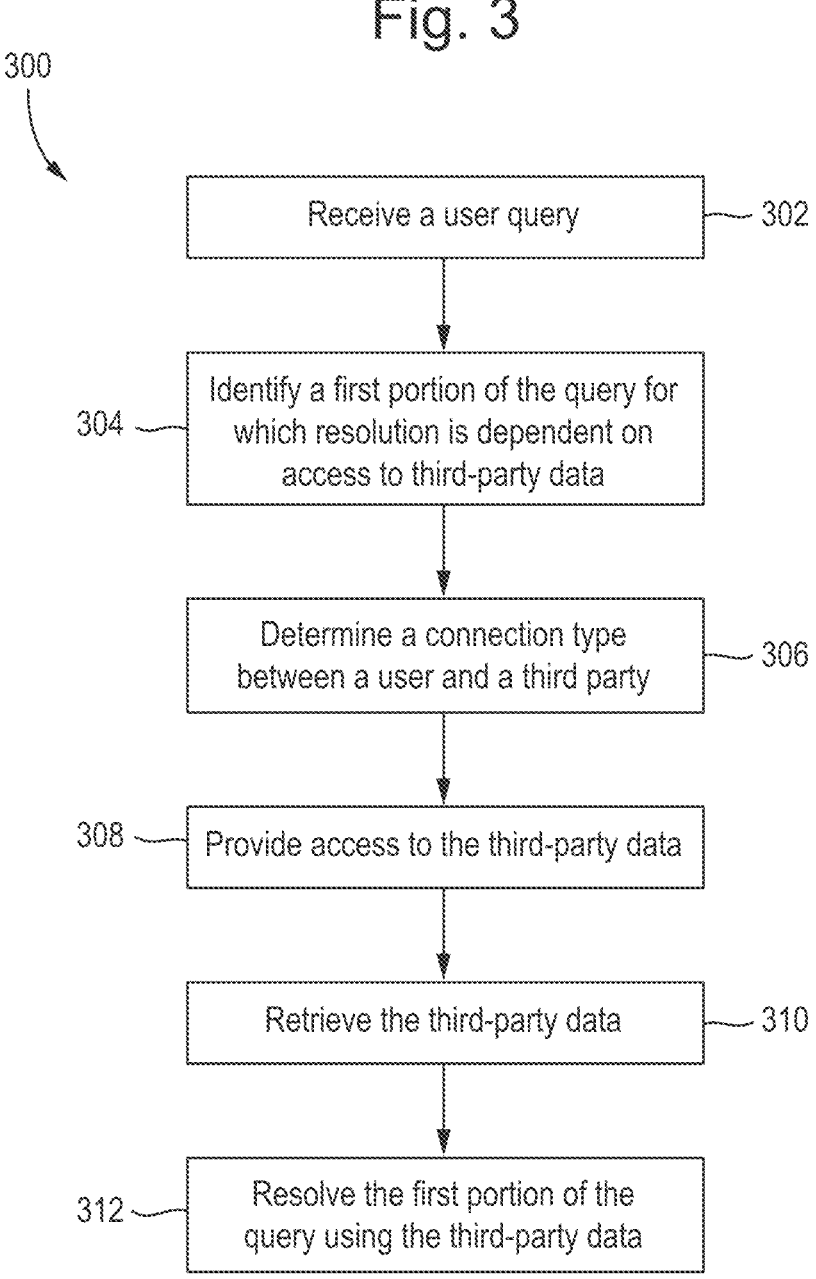
FIG. 3 is a flowchart representing a process for responding to queries, in accordance with some examples of the disclosure.

FIG. 3 shows a flowchart representing an illustrative process 300 for responding to a query. While the example shown in FIG. 3 refers to the use of system 100, as shown in FIG. 1, it will be appreciated that the illustrative process 300 shown in FIG. 3 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 302, control circuitry, e.g., control circuitry of server 104, receives a user query. For example, user 110 may issue a query to VA device 102*a*, which is received at a VA service operating on server 104 via network 108. In this example, user 110 may instruct VA device 102*a* to "Buy a T-shirt for Jason".

At 304, control circuitry, e.g., control circuitry of server 104, identify a portion of the query for which resolution is dependent on access to third-party data. For example, control circuitry may generate a dependency tree for the query. A dependency tree may be generated using dependency parsing to analyze the grammatical structure of the language of the query to identify the relationships amongst the words of a sentence. Each node of the dependency tree may contain a word in the query along with its part-of-speech tagging, e.g., as per the "Penn Treebank" project. Additionally, each edge in the dependency tree represents a dependency between two nodes it connects. Conventional techniques of dependency parsing and query tree generation can be used to represent sub-queries creation. In this example, control circuitry may determine that resolution of the query relies on resolution of two sub-queries: "Buy a T-shirt [in Jason's size]" and "What is Jason's T-shirt size?". It will be appreciated, that while the original query did not explicitly issue a request to determine Jason's T-shirt size, control circuitry may determine that such information is necessary, e.g., based on first trying to buy a T-shirt from an online store, which requires a size to be input, and/or based on one or more historic queries, in which purchase of a clothing item has been requested. In this example, control circuitry determines that resolution of the second sub-query "What is Jason's T-shirt size?" requires access to private data, e.g., Jason's sizing data, and resolution of the first sub-query "Buy a T-shirt [in Jason's size]" is dependent on resolution of the second sub-query. Such tagging can be used to identify an appropriate data source, e.g., a dataspace, and request access to that data source. For example, control circuitry may identify Jason's private data as a data source required to resolve the second sub-query.

In some examples, control circuitry may tag each of the sub-queries depending on the data/entity type of a connecting node in the dependency tree. For example, control circuitry can tag a node and associated sub-queries as a "public information query", a "personal data dependent query", or "third-party private data dependent query". A list of data/entity type that needs to be tagged as private data or third-party private data dependent query can be predefined. For example, any sub-query requiring location history, purchase history, relationship, financial transaction, personally identifiable information, health record, etc., can be tagged as a "private data dependency query". A similar sub-query requiring location history, purchase history, relationship, financial transaction, personally identifiable information, health record, etc., of a friend/family/colleague can be tagged as a "third-party private data dependency query".

At 306, control circuitry, e.g., control circuitry of server 104, determines a data access configuration set by Jason. In particular, control circuitry determines a connection type between user 110 and Jason. For example, control circuitry may determine that Jason is a relative of user 110, e.g., [Connection type=Family]. In response to determining the connection type, control circuitry determines whether the connection type between the user 110 and Jason matches a connection type that is allowed to access Jason's private data, or at least a subset of Jason's private data. For example, Jason may set a data access configuration indicating which type or types of connection can access which types of data. In this example, Jason may set his data access configuration to allow family members to access clothing size information, either directly as indicated by Jason, e.g., a user input to a clothing size database, or as indicated from data relating to a previous clothing purchase made by Jason. Setting of the data access configuration is described below in more detail in relation to FIGS. 7A and 7B.

At 308, control circuitry, e.g., control circuitry of user device 102*b*, provides access to Jason's private data, e.g., in response to determining that [Connection type=Family] and Jason allowing Family members to access his private data, e.g., relating to clothing sizing. In the example shown in FIG. 1, VA service may request access to Jason's private via a request sent to Jason's personal user device 102*b*. Access to Jason's private data may be managed a system component of user device 102*b*. More detail on the system component is described below in relation to FIGS. 4A to 4C. In this example, the system component of user device 102*b* compares the connection type to the connection type(s) that Jason for which Jason has provided access to his private data. For example, Jason may set his data access configuration to allow [Connection type=Family] and [Connection type=Friend Level 1] to access his clothing size data, but not allow any other connection type, such as [Connection type=Friend Level 2] and/or [Connection type=Colleague], to access his clothing size data. In addition to providing access to the private data, the system component of user device 102*b* may provide metadata with instructions on how the private data is to be handled, e.g., following it being used. For example, the metadata may indicate how different connection types should handle the private data, e.g., the metadata may indicate that [Connection type=Family] may handle the private data in a first manner, e.g., by retaining the private data, while [Connection type=Friend Level 1] may handle the private data in a second manner, e.g., by deleting the private data after a period or its first use. In particular, the metadata may indicate a location, e.g., a database, from which the private data may be retrieved. More detail on setting the data access configuration and instructions on how the private data is to be handled is described below in relation to FIGS. 7A and 7B.

At 310, control circuitry, e.g., control circuitry of server 104, retrieves the private data. For example, control circuitry may access database 106*b*, which stores Jason's clothing size data. In some examples, the private data may be retrieved from one or more applications running on, or accessible by, user device 102*b*. For example, Jason's clothing size data may be stored in an online shopping application running on user device 102*b* and accessing data stored on a server of the online shopping application. In this example, control circuitry may retrieve data indicating that Jason's T-shirt size is [Size=Medium].

At 312, control circuitry, e.g., control circuitry of server 104, resolves the sub-query "What is Jason's T-shirt size?" using the private data retrieved at 310. Following this, control circuitry is able to resolve the sub-query "Buy a T-shirt [Size=Medium]". In this manner, control circuitry performs progressive querying by resolving sub-queries using private data from respective data sources. Using the answer of a first private data source, the system can further query another private data source or public information. The process of handling complex queries, in particular, progressive queries using a query tree, allows for the use of multiple information sources or search engines, each having access to a set of personal data, to obtain results. In this manner, for instance, personal data repositories, services or apps can be used for getting the result of sub-queries in combination with the use of general search engines. In short, control circuitry may be configured to retrieve the private data of a third party to resolve one or more sub-queries based on a data access configuration set by a third party, such as Jason, in order for another user to buy a T-shirt for Jason without initially know which size of T-shirt to buy.

The actions or descriptions of FIG. 3 may be done in any suitable alternative orders or in parallel to further the purposes of this disclosure.

Figure 4:
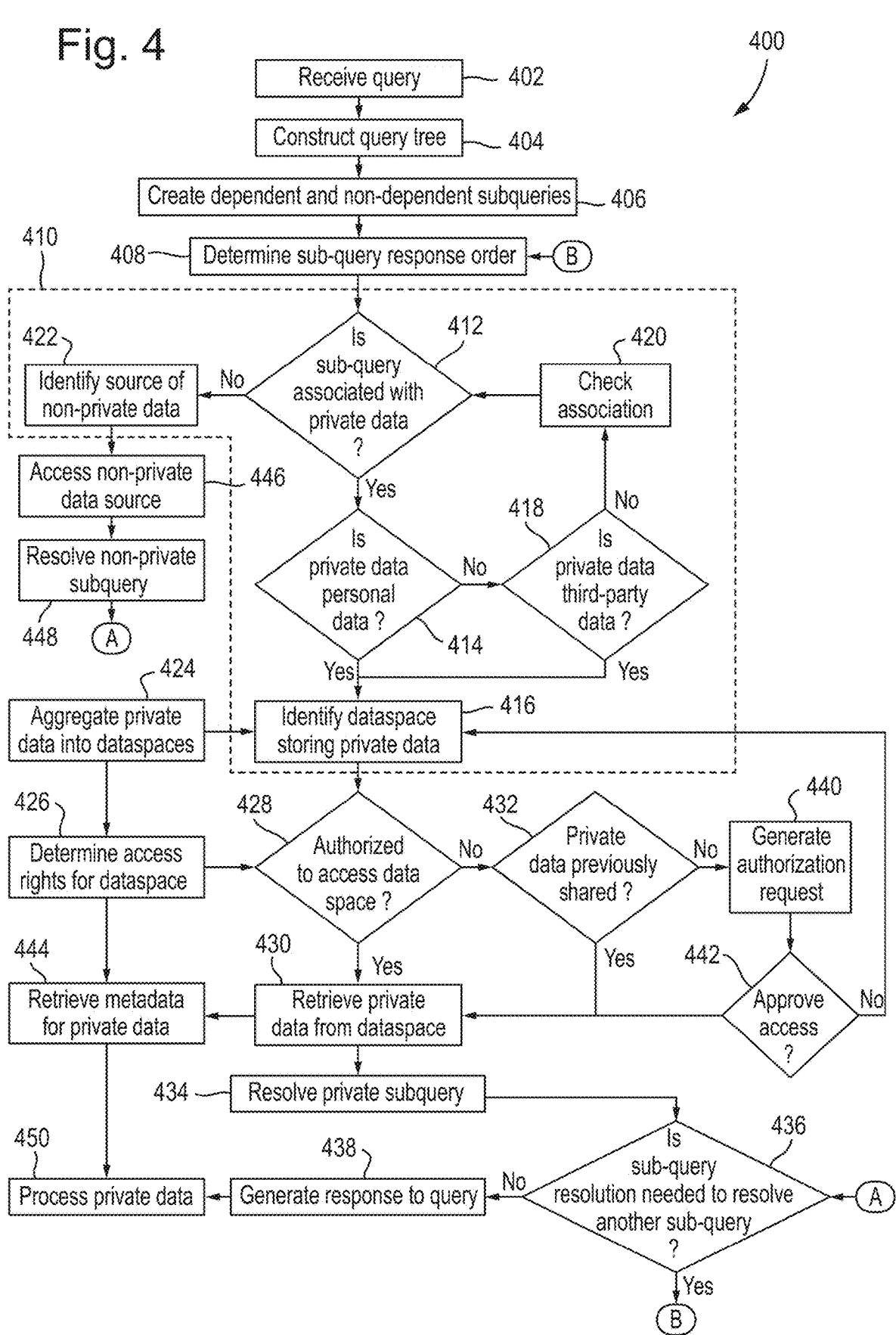
FIG. 4 is a flowchart representing a process for responding to queries requiring access to private and non-private data, in accordance with some examples of the disclosure.

FIG. 4 shows a flowchart representing an illustrative process 400 for responding to a complex query using private and non-private data. While the example shown in FIG. 4 refers to the use of system 100, as shown in FIG. 1, it will be appreciated that the illustrative process 400 shown in FIG. 4 may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 402, control circuitry, e.g., control circuitry of server 104, receives a user query, e.g., in a similar manner to that described at 302. For the following example referring to process 400, the query issued by user 110 to VA device 102*a* is "Play the movie Jason was watching last time I visited him".

At 404, control circuitry, e.g., control circuitry of server 104, constructs a query tree. For example, control circuitry uses dependency parsing to break down the query into its grammatical parts, e.g., in a manner similar to that described above at 304.

At 406, control circuitry, e.g., control circuitry of server 104, creates multiple sub-queries, based on the query tree constructed at 404. For example, control circuitry determines which portions of the user's query are dependent upon answers to another portion or portions of the query, and creates a series of dependent sub-queries. In this example, the query "Play the movie Jason was watching last time I visited" can be broken down into the following sub-queries (SQ) and responses (R):

Sub-query 1: "When did the user last visit Jason?"
Response 1: [Time and Date]
Sub-query 2: "What movie was Jason watching at [Response 1]?"
Response 2: [Movie]
Sub-query 3: "Play [Response 2]"
Response 3: Provide access to [Response 2]

In this example, R3 is dependent upon R2, which is dependent upon R1, which is not dependent on a response to another sub-query. As such, SQ1 may be assigned a dependency level DL=1, SQ2 may be assigned a dependency level DL=2, and SQ3 may be assigned a dependency level DL=3.

At 408, control circuitry, e.g., control circuitry of server 104, determines an order in which to handle responding to the sub-queries. For example, control circuitry may queue the sub-queries based on the dependency levels. In this manner, a sub-query with the lowest dependency level is handled first, while a sub-query with the highest dependency level is handled last. In this example, SQ1 is to be handled first, then SQ2, then SQ3. However, in other examples, sub-queries may be handled differently. For example, one sub-query may be dependent upon responses to multiple other sub-queries, which may be handled according to a dependency level and/or in parallel.

At 410, control circuitry, e.g., control circuitry of server 104, identifies a data source for responding to each of the sub-queries, e.g., in an order based on the dependency level of the query. For example, 410 may first be performed for SQ1, then SQ2, and then SQ3. In the example shown in FIG. 4, 410 comprises 412 to 422. The below example describes 410 for each of SQ1-SQ3 in turn.

At 412, control circuitry determines whether SQ1 is associated with private data, e.g., by. In this example, SQ1 is "When did the user last visit Jason?", in which each of the user and Jason can be classified as entity nodes in the query tree. For each node of the query tree control circuitry may determine whether the nature of data associated with a node is private or non-private data. For SQ1, each of the user and Jason may be predefined in an entity database as entities associated with private data. In some examples, any data associated with the user may be set, aeg by default, as private data in the entity database. In some examples, control circuitry may determine that data associated with Jason is also private data, e.g., by Jason being another entity in the entity database. In some examples, control circuitry may add entities to the entity database based on one or more other databases, such as an address book of the user, or a register, such as a list of students, employees, etc. Additionally or alternatively, control circuitry may try to access, e.g., as default, data relating to one or more entities in a sub-query. In response to access being denied for an entity, that entity may be added to the entity database as an entity associated with private data. In the example shown in FIG. 4, SQ1 is tagged as a sub-query requiring private date, and process 400 moves to 414. When a sub-query does not relate to private data, process 400 moves to 422, as discussed below.

At 414, control circuitry determines whether the private data relates to personal private data. For example, control circuitry may determine a subject of the sub-query and an intent of the sub-query, e.g., using automatic speech recognition and/or natural language processing techniques, (and/or any other appropriate processing technique). For SQ1, the subject the user and the intent relates to determining time/date data relating to the user. For example, any sub-query requiring user data relating to location history, purchase history, relationship, financial transaction, personally identifiable information, health records, etc. can be tagged as a "personal private data dependent query". As such, control circuitry may determine that personal private data is required in order to resolve SQ1, and process 400 moves to 416. When a sub-query does not relate to personal private data, process 400 moves to 418, as discussed below.

At 416, control circuitry identifies a location, e.g., a dataspace, from which personal private data of the user can be accessed. For example, control circuitry may determine that access to the user's calendar and location data is needed based on matching the intent of the query, e.g., determining a location history, to a dataspace of user 110 labelled or tagged for storage of location history data. In the example shown in FIG. 4, private data for user 110 is aggregated into various dataspaces as described at 424 below.

Figure 5:
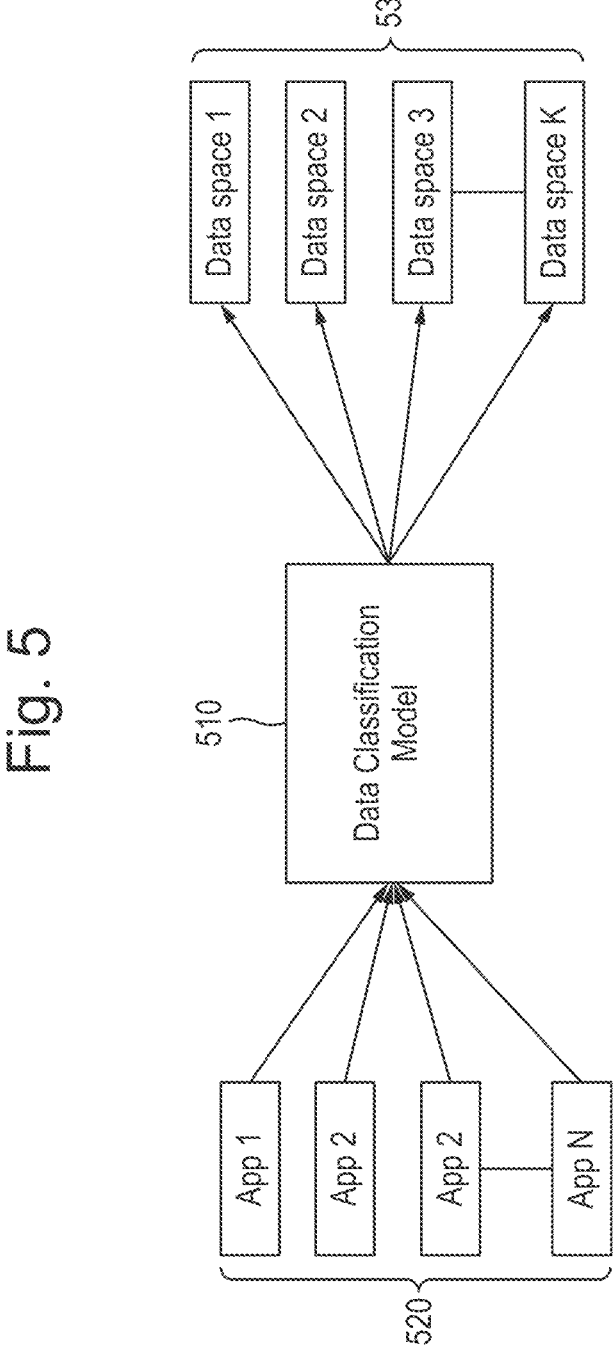
FIG. 5 is a block diagram illustrating a data classification model, in accordance with some examples of the disclosure.

At 424, control circuitry, e.g., control circuitry of user device 102 and/or server 104, aggregates private data into various dataspaces, e.g., using a data classification model executed by a system component. For the avoidance of doubt, the processes of 424 are applicable to aggregating private data of the user 110 and/or private data of the third party 112. FIG. 5 illustrates how a machine learning data classification model 510 can be used to aggregate data into data spaces. In particular, data classification logic can be used by model 510 to classify private data collected from one or more applications 520 running on user devices, e.g., user device 102, into different dataspaces 530, e.g., based on data type, such as location data, media data, financial data, etc. For example, model 510 may group data of the same type, e.g., media data, from multiple applications, e.g., media applications, into a dataspace. For example, in FIG. 5, App 1 and App 2 may be applications for streaming media content to a user device 102. As such, each of App 1 and App 2 may generate/capture data relating to media content consumed by user 110. Model 510 maybe configured to request data from each of App 1 and App 2, and analyse any data received. Where model 510 determines a match (or at least a relationship between) the types of data generated by App 1 and App 2, model 510 may aggregate the data by type, and store that data in a dataspace, e.g., Dataspace 1. In a similar manner, model 510 may aggregate data into a dataspace based on the type of an application generating/capturing the data. For example, model 510 may aggregate data, e.g., all data, from multiple financial service applications into a dataspace. In some examples, in response to private data being captured by an application, system 100, e.g., model 510, may receive a notification from that application indicting that new private data is ready to be sent for analysis.

Additionally, or alternatively, model 510 may aggregate data based on trends relating to how user 110 shares data. For example, model 510 may take information from social media posts, past configurations and/or user authorizations to determine what type of data a user is sharing with what type of social connections. For example, model 510 may analyse past communication between user 110 and another party to determine one or more types of data normally shared with that party, and one or more other types of data that are not normally shared with that party. For example, user 110 may consistently share one or more types of data, e.g., media data and weekend travel data, with a certain group, e.g., a group of friends in a group chat session on a messaging application, but not other types of data, such as financial transaction data. As such, model 510 may aggregate media data and weekend travel data from various applications and store these types of data in a dataspace, e.g., for future access by a certain group of friends.

Additionally or alternatively, a dataspace may be manually configured. For example, user 110 may instruct control circuitry to aggregate and store data from various sources in a dataspace. For example, user 110 may instruct control circuitry to aggregate data previously shared with and/or relevant to a group, e.g., a family group, into a dataspace.

Figure 6A:
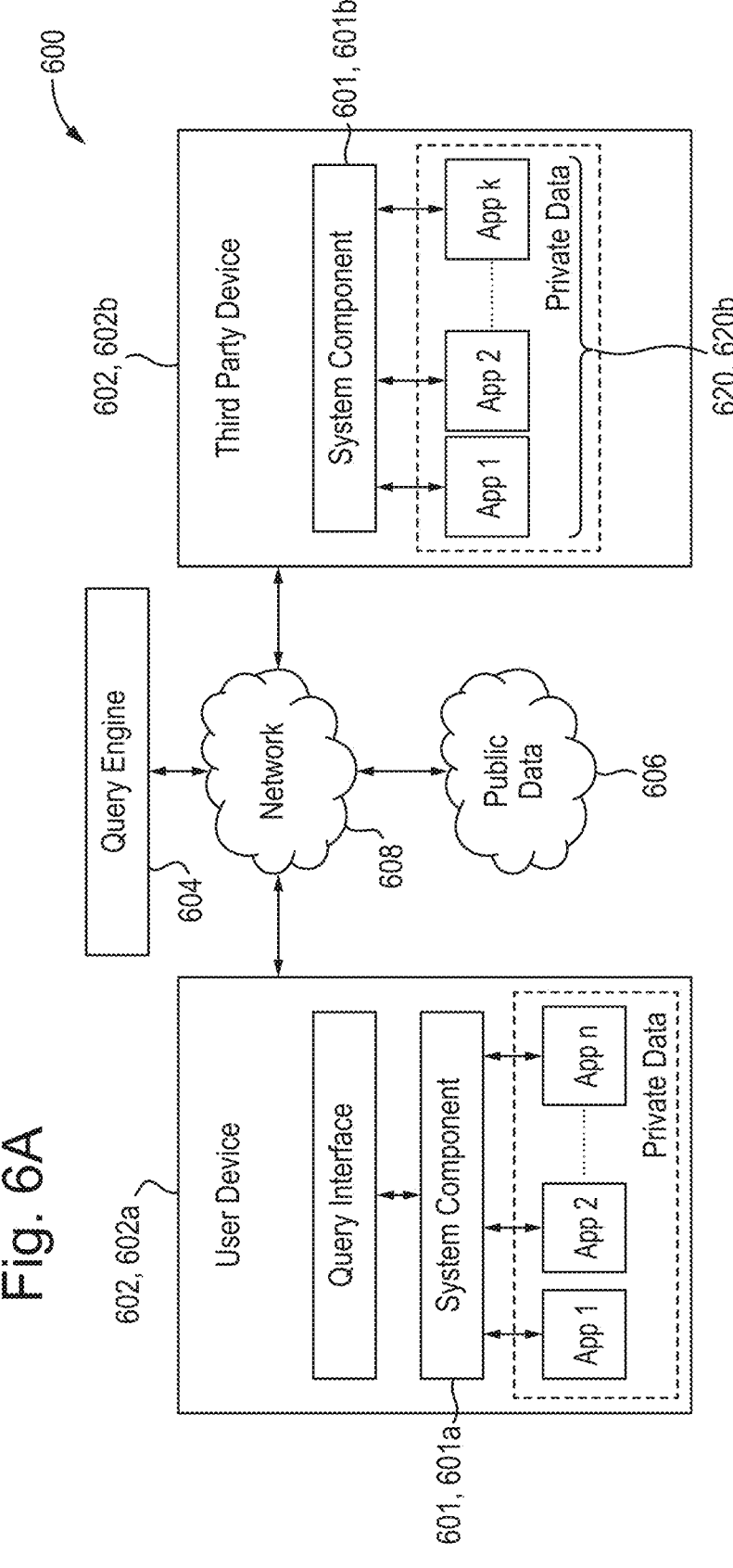
FIG. 6A illustrates an example system for responding to queries, in accordance with some examples of the disclosure.
Figure 6B:
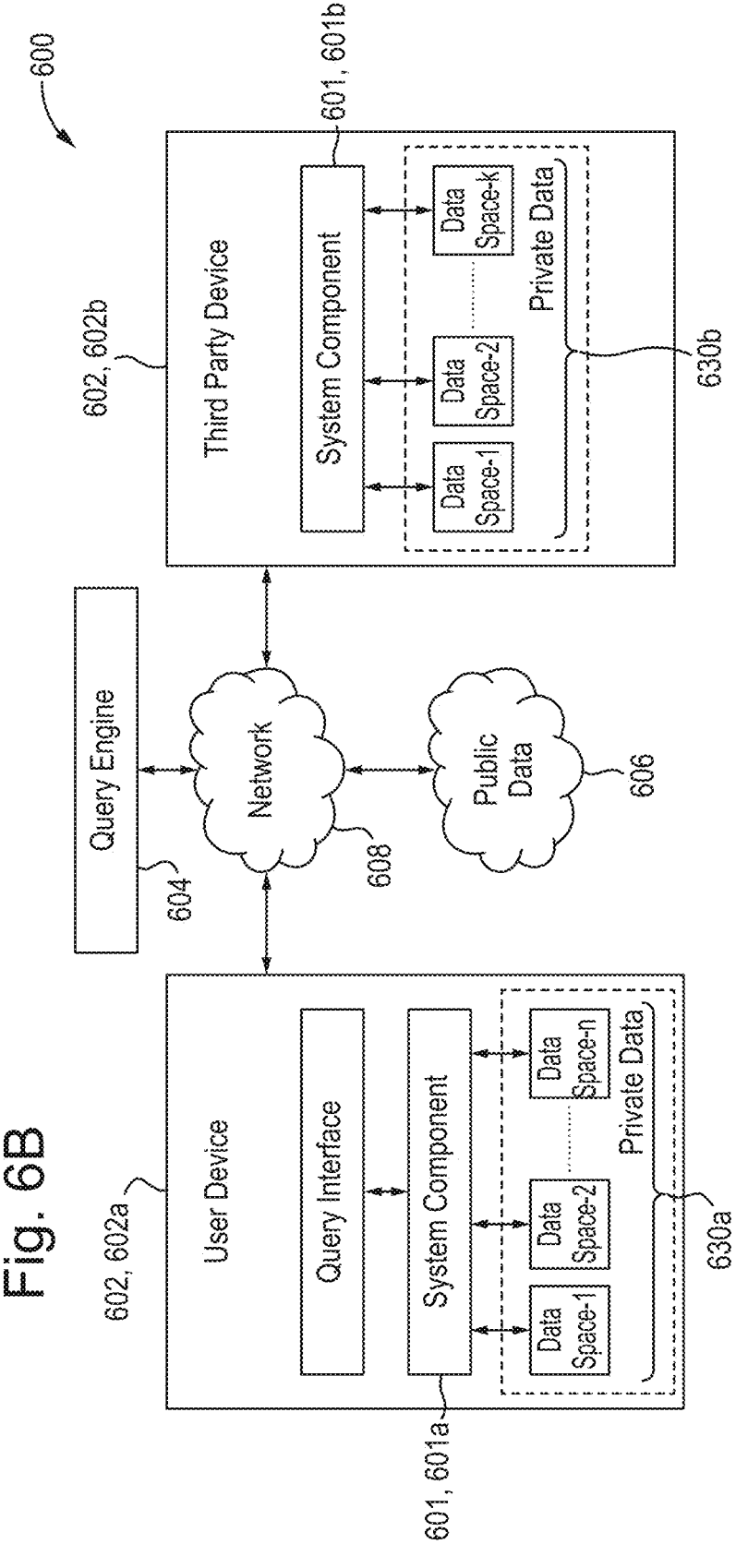
FIG. 6B illustrates an example system for responding to queries, in accordance with some examples of the disclosure.
Figure 6C:
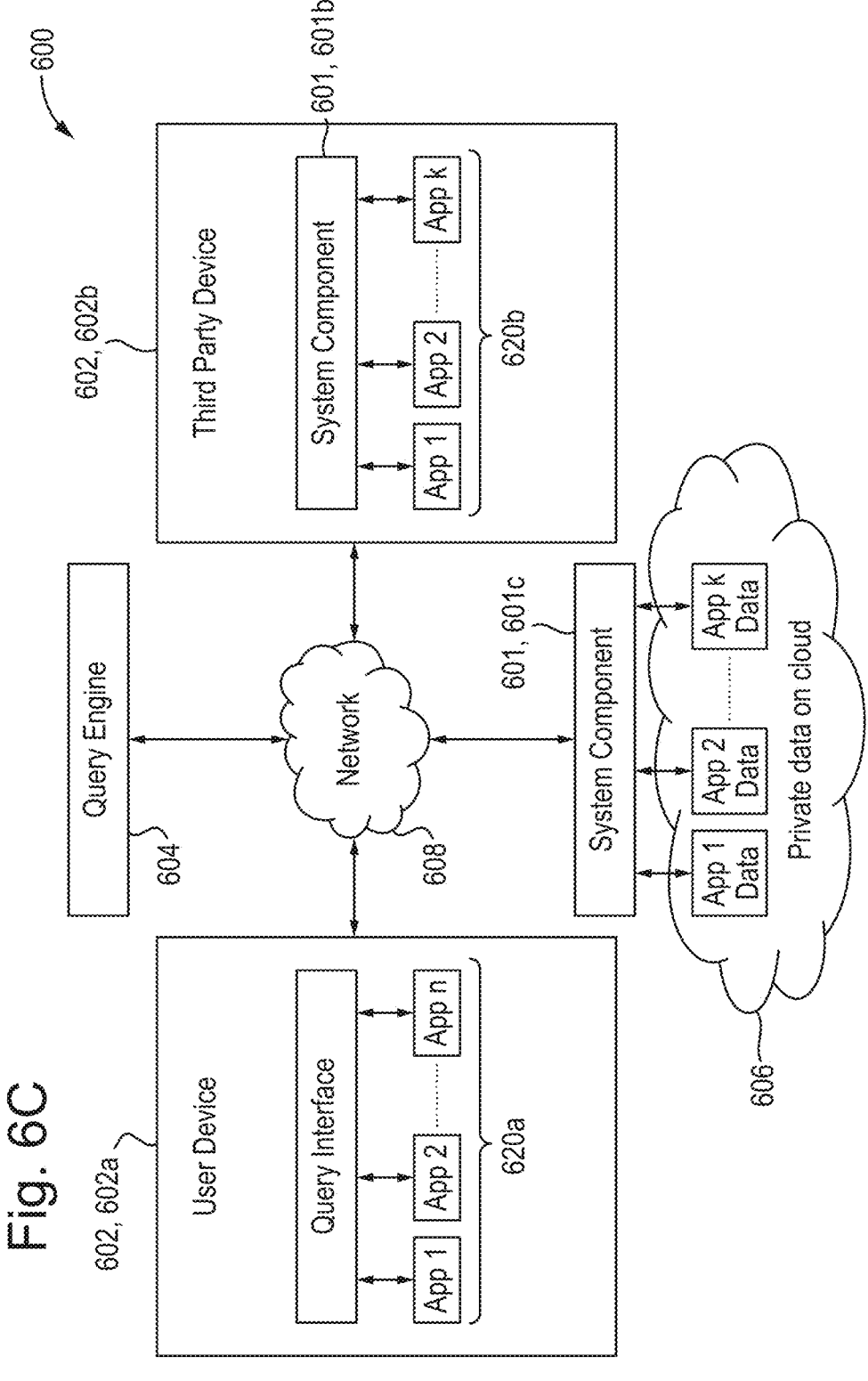
FIG. 6C illustrates an example system for responding to queries, in accordance with some examples of the disclosure.

FIGS. 6A to 6C illustrates examples of a system 600 for responding to a query. In particular, FIGS. 6A to 6C illustrate how a system component 601 may manage the capture and storage of private data from each of user device 602a and third-party device 602b. For example, system component 601 may execute, at least in part, a machine learning model, e.g., model 510 of FIG. 5, for aggregating private data from various sources in discrete dataspaces.

In the example shown in FIG. 6A, system component 601a of user device 602a accesses private data of various applications 620a e.g., App 1, App2 . . . . App n, executable by user device 602a. In a similar manner, system component 601b of user device 602b accesses private data of various applications 620b, e.g., App 1, App2 . . . . App k, executable by user device 602b. Each of user device 602a and 602b are communicatively coupled via network 608 to each other, server 604 running a query engine and public data, e.g., stored on cloud storage 606.

In the example shown in FIG. 6B, system component 601a of user device 602a manages various dataspaces 630a, e.g., Dataspace 1, Dataspace 2 . . . . Dataspace k, stored on (or otherwise accessible by) user device 602a. In a similar manner, system component 601a of user device 602a manages various dataspaces 630a, e.g., Dataspace 1, Dataspace 2 . . . . Dataspace n, stored on (or otherwise accessible by) user device 602a. For the avoidance of doubt, user device 602a shown in FIG. 6A may be the same user device as or a different user device from user device 602a shown in FIG. 6B, and user device 602b shown in FIG. 6A may be the same user device as or a different user device from user device 602b shown in FIG. 6B.

In the example shown in FIG. 6C, system 600 comprises system component 601c for managing private data stored on cloud storage 606. For example, system component 601c may be responsible for accessing private data of various applications 620a and 620b executable, at least in part, by respective user devices 602a and 602b. Additionally or alternatively, system component 601c may be responsible for managing various dataspaces stored remote from user device 602a and 602b, e.g., in cloud storage 606. For the avoidance of doubt, the features show in FIGS. 6A to 6C are not mutually exclusive and may be combined where technically feasible.

Returning to FIG. 4, at 426, control circuitry, e.g., control circuitry of user device 102 and/or server 104, determines access rights for a dataspace, e.g., location history dataspace of user 110. For example, the user may set access parameters relating to which type of personal private data control circuitry can access, e.g., without further authorization. For example, user 110 may configure one or more settings in system 100 to allow control circuitry to access certain data, such as calendar data and/or location history data, without further authorization being provided to system 100. However, the user 110 may configure one or more settings in system 100 to prevent the control circuitry from being able to access other types of data, such as financial transaction data, personally identifiable information, health records, etc., without further authorization being provided to system 100. For example, control circuitry may be configured to request authorization from user 110 to allow control circuitry to access one or more personal private data locations. In this example, user 110 has configured system 100 to allow control circuitry to freely access calendar data and location history data, so that control circuitry can retrieve data relating to the location history of user 110.

At 428, control circuitry, e.g., control circuitry of user device 102 and/or server 104, determines whether authorization has been granted to access the required dataspace. For example, in order to resolve SQ1, "When did the user last visit Jason?", control circuitry requires access to user's calendar and location history data. In this example, when resolving SQ1, user 110 has provided automatic access to their calendar and location history data, and process 400 moves to 430. However, should control circuitry not be authorized to access the dataspace required for resolving the query, then process 400 moves to 432, which is discussed later in more detail.

At 430, control circuitry, e.g., control circuitry of user device 102 and/or server 104, retrieves the personal private data from the identified dataspaces. For example, control circuitry may access a calendar and location history data of user 110 and determine that user 110 last visited Jason on Mar. 25, 2023 at 13:36. Such a determination may be made based on GPS data indicating that user 110 was at Jason's home address, e.g., in conjunction with accessing Jason's address data in a contact list of user 110. In some examples, control circuitry may also retrieve metadata relating to the handling of the private data, e.g., once a sub-query has been resolved. The retrieval of metadata is discussed below in more detail.

At 434, control circuitry, e.g., control circuitry of server 104, resolves the private sub-query. For example, control circuitry determines that R1=13:36 on Mar. 25, 2023.

At 436, control circuitry, e.g., control circuitry of server 104, determines whether R1 is needed in the query tree to resolve another sub-query, e.g., one that is further up the query tree. In this example, R1 is needed to resolve SQ2, and process 400 moves back to 408. However, should a response not be needed to resolve another sub-query, process 400 moves to 438, which is described later in more detail.

Returning to 408, control circuitry determines which sub-query requires R1 for its resolution. In this example, SQ2 is "What movie was Jason watching at [R1]?", which becomes "What movie was Jason watching at [13:36 on Mar. 25, 2023]?". Process 400 then iterates through 410. For example, in a similar manner to that described above for SQ1, control circuitry determines that SQ2 is associated with private data at 412, that the private data is not personal private data of the user 110 at 414, and that the private data is third-party private data at 418, e.g., based on analysing the intent of SQ2. In this example, the third-party private data may be data of Jason, e.g., his recent viewing history, that is accessible via another third party, e.g., a content provider. In some examples, control circuitry may not be able to determine to which party the private data is associated with, e.g., should control circuitry not be able to determine an intent of the sub-query, or the identity of one or more of the parties in the sub-query. In such as case, process 400 moves to 420, where the output from 412 is checked. For example, control circuitry may issue a notification to user 110 requesting confirmation or clarification regarding the sub-query. In response to checking the association, process 400 moves back to 412.

Figure 7A:
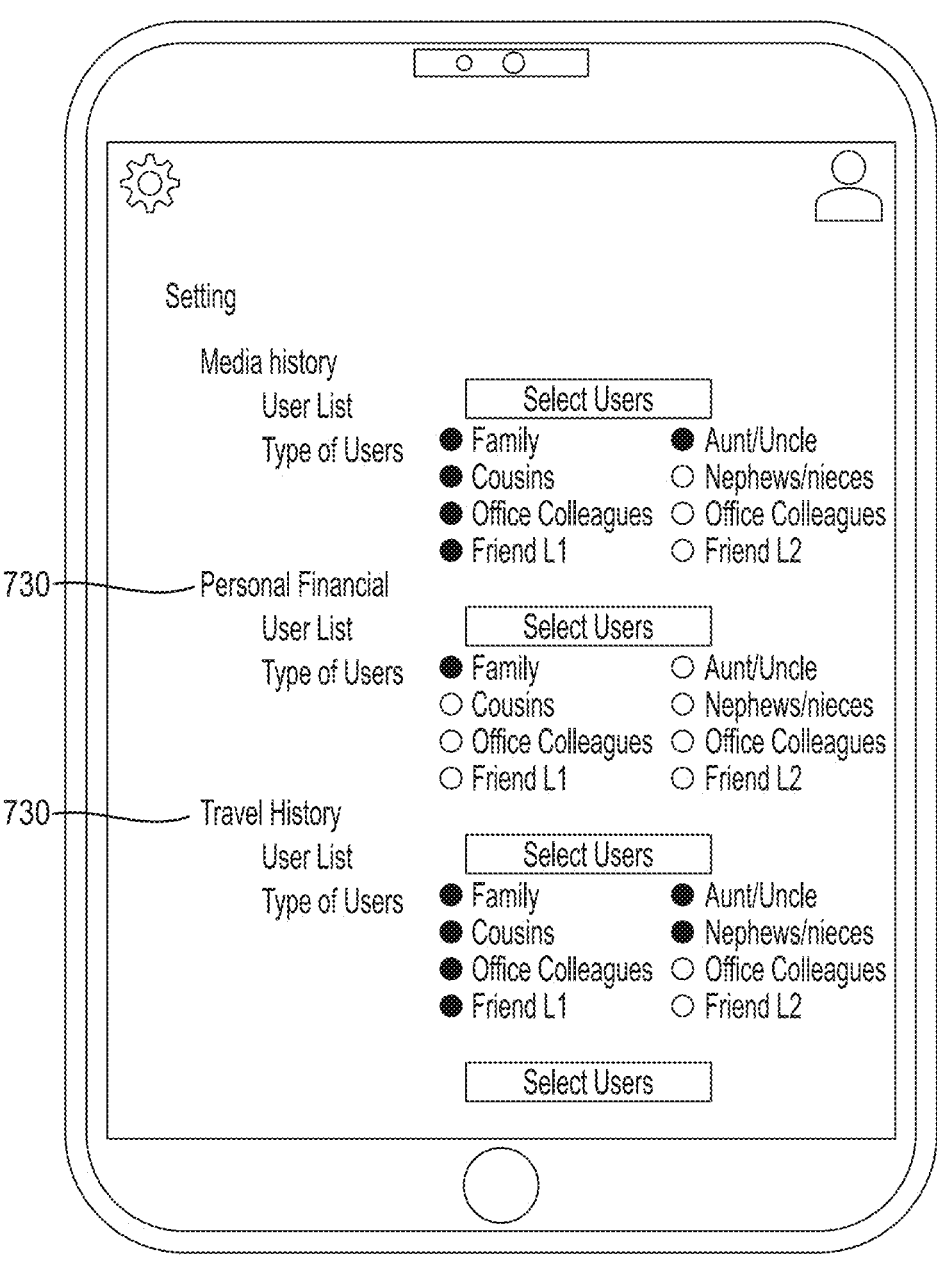
FIG. 7A illustrates a GUI for controlling dataspace settings, in accordance with some examples of the disclosure.
Figure 7B:
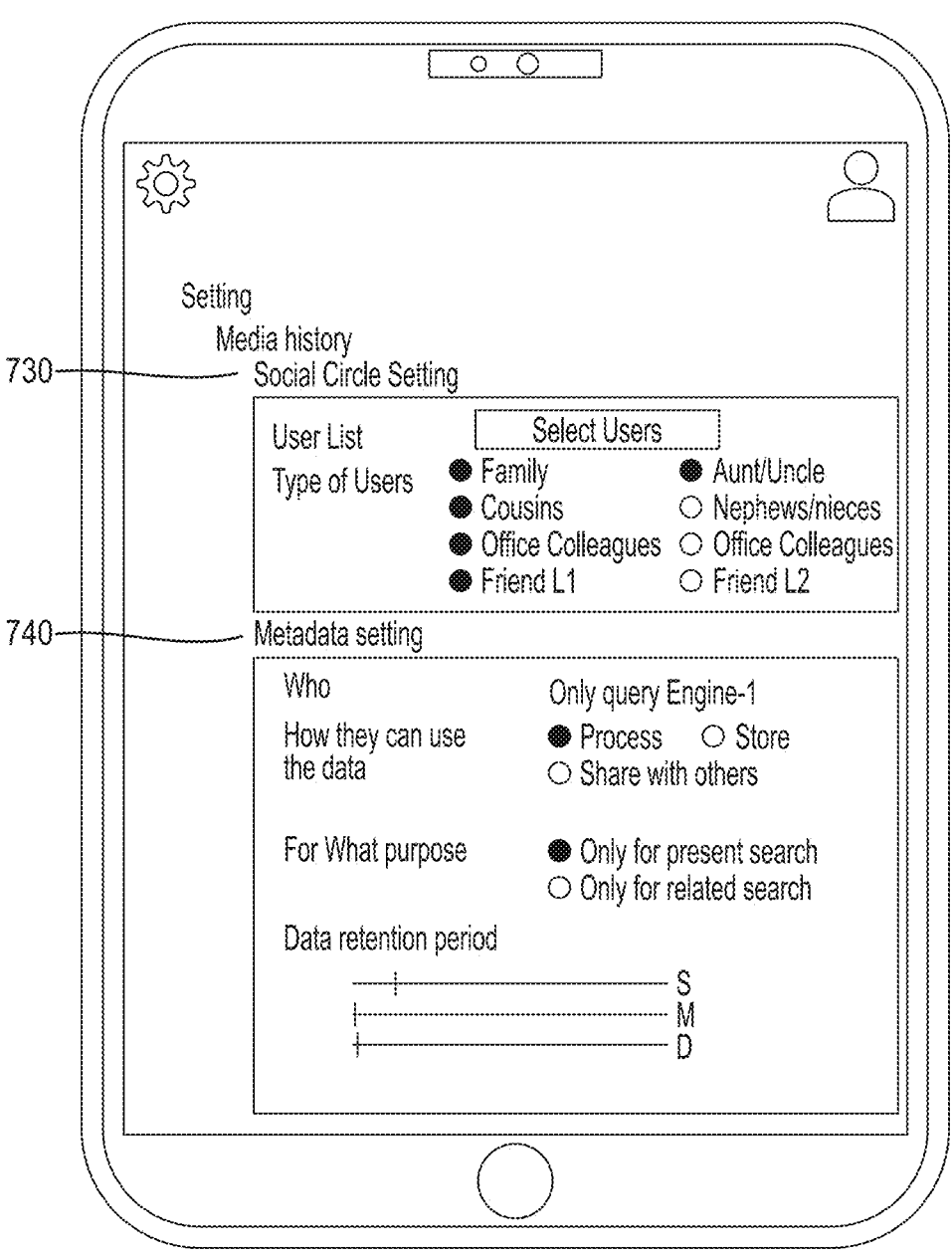
FIG. 7B illustrates a GUI for controlling social circle and metadata settings, in accordance with some examples of the disclosure.

Returning to 418, in response to determining that the private data is third-party private data, process 400 moves to 416, where control circuitry identifies a dataspace storing the third-party private data relevant to resolving SQ2. For example, based on the subject entity (i.e., Jason) and intent (i.e., accessing viewing history) of SQ2, control circuitry identifies a dataspace associated with Jason's viewing history. For example, Jason's private data may be aggregated and stored, with configured access rights, in a manner similar to that described at 424 and 426 above. In addition, Jason may configure access settings for each data space. For example, FIG. 7A illustrates a GUI allowing a user, e.g., third party 112 (Jason), to configure which connection types (e.g., individuals and/or groups) may access various dataspaces 730. For example, for each dataspace 730 a user can toggle access rights for various connection types. In the example shown in FIG. 7A, for the "Media History" dataspace 730, the groups Family, Cousins, Office Colleagues, Friend L1 and Aunt/Uncle have been provided with access to the "Media History" dataspace (indicated by the solid circle), and the groups Nephews/Nieces, Other Colleagues and Friends L2 have not been provided with access to the "Media History" dataspace (indicated by the open circle). In this manner, a "Social Circle" has been set up indicating which of a user's connection types may access data in a dataspace. Other access settings have been made for the "Personal Financial" dataspace 730 and the "Travel History" dataspace 730. In some examples, the access rights for each dataspace may be stored on user device 102 and/or server 104. For example, control circuitry may query a database of access right to establish which connection types (e.g., individuals and/or groups) have been provided with access. In the example shown in FIG. 7B, Jason has configured the "Media History" dataspace 730 such that it is accessible by a certain subset of his connections/connection types. For example, Jason has set his "Social Circle" setting to allow the groups Family, Cousins, Office Colleagues, Friend L1 and Aunt/Uncle access to his "Media History" private data. In addition, FIG. 7B illustrates "Metadata Setting" 740, which controls how the private data in the dataspace can be used, and allows a user to place conditions on how the data in a dataspace is handled. In the example shown in FIG. 7B, the "Metadata Settings" comprise various fields, such as "Who", "How", "What" and "How long". For example, a user, such as Jason, may indicate the identity of a search engine for which access to a dataspace may be granted. In FIG. 7B, Jason provides access to the "Media History" dataspace for only queries received from a particular query engine. In this manner, access to a party's private data may be more securely controlled, e.g., by allowing only trusted query engines access to a private dataspace. Additionally, a party may specific how the private data can be used upon access being granted. In the example shown in FIG. 7B, Jason has configured the "Metadata Settings" such that the private data can only be used in the process of providing a response to the present query. Other options for handling the private data include storing the private data, sharing the private data with others and using the private data in related searches, for example. Another option for handling the private data relates to a retention period that the private data may be accessed or held, e.g., in a cache. In the example shown in FIG. 7B, the retention period has been set at a certain number of second, e.g., 5 seconds, after which access to the private data will end, e.g., by restricting access to or usage of the private data, or by deleting a temporary copy of the private data made for the purpose of responding to the query.

Returning to 428, control circuitry, e.g., control circuitry of server 104, determines whether user 110 is authorized to access Jason's "Media History" dataspace. For example, control circuitry may determine, e.g., by accessing a profile of user 100, an identity of user 110. In this example, user 110 is a one of Jason's friends. In order to determine which connection type (e.g., Friend L1, Friend L2, etc.) Jason's friend is, control circuitry may access a database of Jason's connections, which indicates the nature of the connection between Jason and user 110. In some examples, the database of Jason's connections may be managed manually by Jason.

Additionally or alternatively, control circuitry may automatically manage Jason's list of connection types. For example, should Jason add a new family member to his address book, control circuitry may automatically add the new family member to the "Family" social circle. In other examples, control circuitry may determine an interaction frequency between user 110 and Jason, and assign user to one or more social circles based on the interaction frequency. In this example, user 110 is a friend of Jason listed under "Friend L2" in a connection list of Jason. As such, control circuitry may assign the connection type "Friend L2" to user 110. Referring to FIG. 7B, Jason has configured the "Media History" dataspace such that a number of predetermined connection types can access the dataspace. Thus, at 428, control circuitry compares the connection type of user 110 (i.e., Family) to the connection types for which Jason has granted access to the "Media History" dataspace (i.e., Family, Cousins, Office Colleagues, Friend L1 and Aunt/Uncle). In response to determining that user is on one or more of the predetermined connection types that are allowed access to Jason private data, process 400 moves to 430. However, in this example, control circuitry determines that the connection type of user 110 is not one of the allowable predetermined connection type that can access the private data, and process 400 moves to 432.

At 432, control circuitry, e.g., control circuitry of server 104, determines whether the private data has previously been shared, e.g., between user 110 and Jason. For example, control circuitry may determine that user 110 had previously been granted access to the "Media History" dataspace, e.g., by virtue of user 110 once being of the connection type "Friend L1", or by virtue of Jason manually sharing the relevant private data with user 110. In some examples, Jason and user 110 may be close friends, but contact between them has not been recent and/or frequent. As such control circuitry may have moved user 110 from one social circle to another, e.g., to reflect the reduced level of communication between Jason and user 110. In this manner, the social circles may be updated, e.g., at predetermined intervals, to maintain accurate social circles. At 432, when control circuitry determines that user 110 has previously been granted access to Jason's "Media History" dataspace, e.g., within a certain period, such as a week or month ago, process 400 moves to 430. However, when control circuitry determines that user 110 has not previously been granted access to Jason's "Media History" dataspace, or was granted access, but outside of a certain period, such as over week or month ago, process 400 moves to 440.

Figure 8:
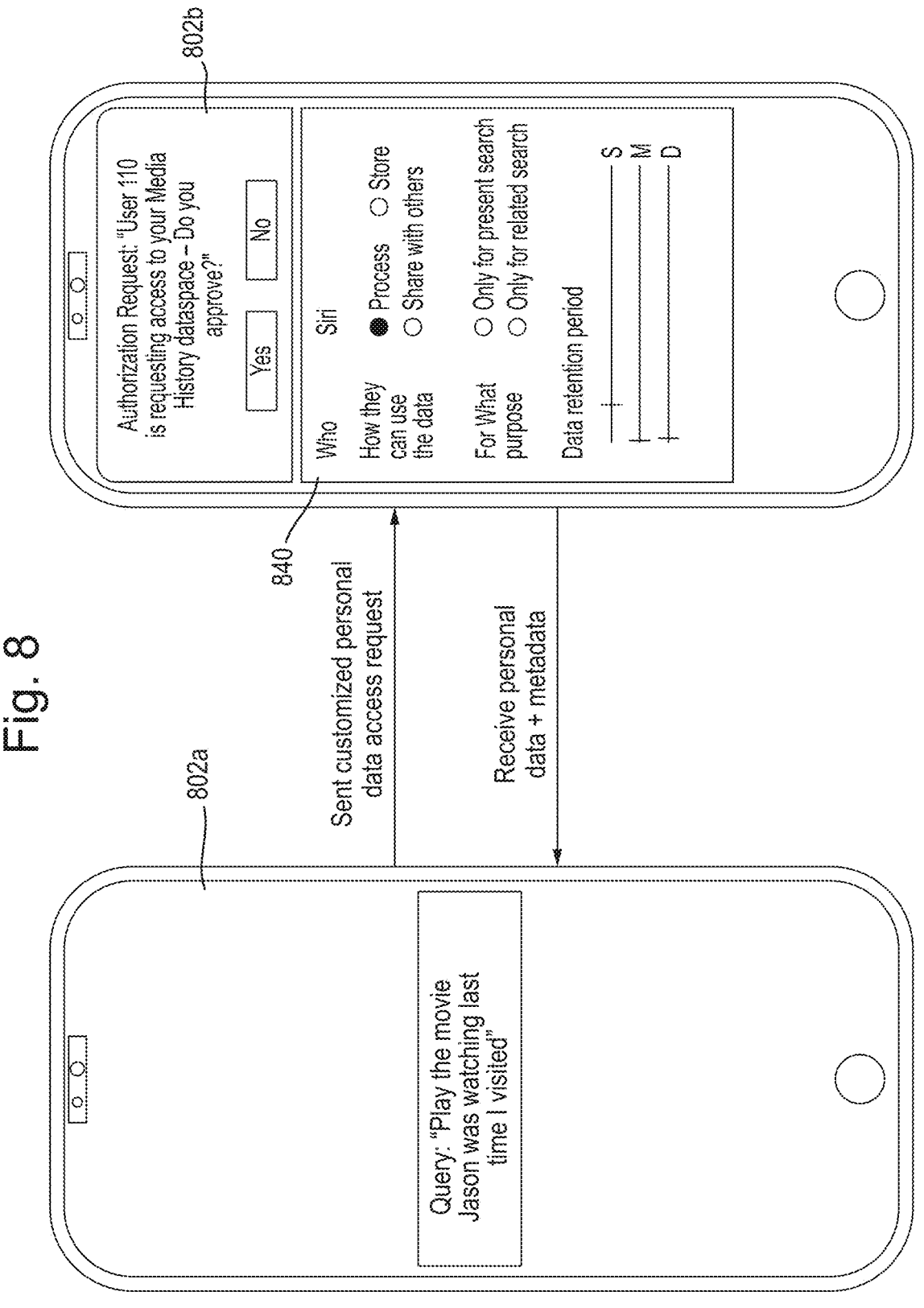
FIG. 8 illustrates a GUI for generating an authorization request for accessing a dataspace, in accordance with some examples of the disclosure.

At 440, control circuitry, e.g., control circuitry of server 104, generates an authorization request. For example, control circuitry may generate and send an authorization request to Jason requesting authorization to allow user 110 to access his private data. FIG. 8 illustrates generation of an authorization request. In particular, FIG. 8 shows user device 802a, which receives the initial query "Play the movie Jason was watching last time I visited", and user device 802b, which displays the authorization request "User 110 is requesting access to your Media History dataspace—Do you approve?". Additionally, the example shown in FIG. 8, provides opportunity for Jason to configure "Metadata Settings" 840, at the same time as granting approval.

At 442, control circuitry, e.g., control circuitry of server 104, receives a response to the authorization request. In response to Jason not authorizing user 110 to access the "Media History" dataspace, process 400 moves to 416, where control circuitry may try to identify another dataspace containing the required data and for which user 110 may have access. In response to Jason authorizing user 110 to access the "Media History" dataspace, process 400 moves to 430.

At 430, control circuitry, e.g., control circuitry of server 104, retrieves the third-party private data from the identified dataspace. For example, control circuitry may access Jason's "Media History" database and determine that Jason was viewing "Frozen" on Mar. 25, 2023 at 13:36. Such a determination may be made based In some examples, control circuitry may also retrieve metadata relating to the handling of the private data at 444, e.g., after a sub-query has been resolved. In this example, control circuitry retrieves "Metadata Settings" 740, shown in FIG. 7B.

At 434, control circuitry, e.g., control circuitry of server 104, resolves the private sub-query. For example, control circuitry determines that R2="Frozen".

At 436, control circuitry, e.g., control circuitry of server 104, determines whether R2 is needed in the query tree to resolve another sub-query, e.g., one that is further up the query tree. In this example, R2 is needed to resolve SQ2, and process 400 moves back to 408. However, should a response not be needed to resolve another sub-query, process 400 moves to 438, which is described later in more detail.

Returning to 408, control circuitry determines which sub-query requires R2 for its resolution. In this example, SQ3 is "Play [R1]?", which becomes "Play [" Frozen "]". Process 400 then iterates through 410. For example, in a similar manner to that described above for SQ1 and SQ2, control circuitry determines whether SQ3 is associated with private data at 412.

At 412, control circuitry determines that SQ3 does not require access to private data to resolve the sub-query, e.g., based on the movie "Frozen" being publicly available, albeit via a subscription to a content provider. In some examples, process 400 comprises determining whether user 110 has permission to view the requested movie. For example, when user 110 holds an active subscription allowing access to the movie "Frozen", process 400 moves to 446. Should user 110 not have an active subscription, a notification may be generated for user 110 indicating that access is not allowed and an active subscription is required.

At 448, control circuitry, e.g., control circuitry of server 104, resolves SQ3, e.g., by providing access to the movie "Frozen", e.g., at user device 102a. Process 400 moves back to 436.

At 436, control circuitry determines whether the response to SQ3 is needed to resolve another sub-query. In this case, it is not, and process 400 moves to 438 where control circuitry generates a response to the query "Play the movie Jason was watching last time I visited" by displaying the movie "Frozen" to user 110.

At 450, the private data is handled according to metadata settings 740. In this example, the metadata settings 740 shown in FIG. 7B indicate that Jason's private data may be used for only processing purposes (i.e., not be stored or shared), only for the present query, and may be retained for only a certain number of seconds. In this manner, Jason's private data has been handled in a secure manner by not only adhering to data handling policies, which in this case have been set by Jason, but also data access policies, indicating which connection type(s) may have access to the data, which again have been set by Jason. However, in other examples, the data handling and data access policies may be set in any appropriate manner, e.g., by a content provider and/or according to one or more data privacy standards. The systems and methods presented herein thus provide improved security when dealing with queries requiring access to private data. In addition, the systems and methods presented herein can reduce the number of authorization requests being generated and sent by a system, since a user can pre-authorize access to their private data. In this manner, operational load on the system is reduced, by virtue of handling few authorization checks.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, using a control circuitry, a query of a user;
   identifying, using the control circuitry, a first portion of the query for which resolution is dependent on access to private data of a third party;
   determining, using the control circuitry, a connection type between the user and the third party, wherein the determining the connection type between the user and the third party comprises at least one of:
      determining a social media connection between an account of the user and an account of the third party indicated by a database of a social media server; or
      determining a communication frequency between a device of the user and a device of the third party;
   determining, using the control circuitry, a category of the private data of the third party;
   in response to the connection type being of a predetermined type and the category being of a predetermined category, providing, using the control circuitry, access to the private data of the third party;
   retrieving, using the control circuitry, the private data of the third party; and
   resolving, using the control circuitry, the first portion of the query using the private data of the third party.

2. The method according to claim 1, the method comprising:
   retrieving metadata defining access parameters of the data of the third party;
   processing the data of the third party according to the access parameters after resolving the first portion of the query.

3. The method according to claim 1, the method comprising:
   in response to the connection type not being of the predetermined type, generating a permission request actionable by the third party; and
   in response to receiving permission of the third party, providing access to the data of the third party.

4. The method according to claim 1, the method comprising:

in response to the connection type not being of the predetermined type, determining one or more historic interactions between the user and the third party;

determining whether the one or more historic interaction comprise the data of the third party; and in response to determining that the historic interaction comprise the data of the third party, providing access to the data of the third party.

5. The method according to claim 1, the method comprising:

generating multiple dataspaces, wherein each dataspace is associated with a predetermined connection type;

assigning the data of the third party to the one or more dataspaces; and in response to the connection type between the user and the third party being of the predetermined type, providing access to the dataspace.

6. The method according to claim 5, wherein assigning the data of the third party to the one or more dataspaces is based on a category of the data of the third party.

7. The method according to claim 1, the method comprising:

aggregating the data of the third party from multiple third party data sources.

8. The method according to claim 1, the method comprising:

determining a type of an application that received the query; and in response to the application type being of a predetermined application type, providing access to the data of the third party.

9. The method according to claim 1, the method comprising:

identifying a second portion of the query for which resolution is not dependent on access to the data of the third party;

determining whether resolution of the second portion of the query is dependent on resolution of the first portion of the query; and prioritizing resolution of the first portion of the query when the resolution of the second portion of the query is dependent on resolution of the first portion of the query.

10. The method according to claim 1, wherein the determining the connection type between the user and the third party comprises determining the communication frequency between a device of the user and a device of the third party.

11. A system comprising:

memory; and control circuitry configured to:

receive a query of a user;

identify a first portion of the query for which resolution is dependent on access to private data of a third party;

determine a connection type between the user and the third party, wherein, when the determining the connection type between the user and the third party, the control circuitry is configured to at least one of:

determine a social media connection between an account of the user and an account of the third party indicated by a database of a social media server; or determine a communication frequency between a device of the user and a device of the third party;

determine a category of the private data of the third party;

in response to the connection type being of a predetermined type and the category being of a predetermined category, provide access to the private data of the third party;

retrieve the private data of the third party; and resolve the first portion of the query using the private data of the third party.

12. The system according to claim 11, wherein the control circuitry is configured to:

retrieve metadata defining access parameters of the data of the third party;

process the data of the third party according to the access parameters after resolving the first portion of the query.

13. The system according to claim 11, wherein the control circuitry is configured to:

in response to the connection type not being of the predetermined type, generate a permission request actionable by the third party; and in response to receiving permission of the third party, provide access to the data of the third party.

14. A system comprising:

memory;

a processor configured to execute instructions stored in the memory; and control circuitry operatively coupled to the processor, the control circuitry configured to:

receive a query of a user;

identify a first portion of the query for which resolution is dependent on access to data of a third party;

determine a connection type between the user and the third party;

in response to the connection type being of a predetermined type:

provide access to the data of the third party; and retrieve the data of the third party;

in response to the connection type not being of the predetermined type:

determine one or more historic interactions between the user and the third party;

determine whether the one or more historic interaction comprise the data of the third party; and in response to determining that the historic interaction comprise the data of the third party, provide access to the data of the third party; and resolve the first portion of the query using the data of the third party.

15. The system according to claim 11, wherein the control circuitry is configured to:

generate multiple dataspaces, wherein each dataspace is associated with a predetermined connection type;

assign the data of the third party to the one or more dataspaces; and in response to the connection type between the user and the third party being of the predetermined type, provide access to the dataspace.

16. The system according to claim 15, wherein control circuitry is configured to assign the data of the third party to the one or more dataspaces is based on a category of the data of the third party.

17. The system according to claim 11, wherein the control circuitry is configured to:

aggregate the data of the third party from multiple third party data sources.

18. The system according to claim 11, wherein the control circuitry is configured to:

determine a type of an application that received the query; and in response to the application type being of a predetermined application type, provide access to the data of the third party.

19. The system according to claim 11, wherein the control circuitry is configured to:

identify a second portion of the query for which resolution is not dependent on access to the data of the third party;

determine whether resolution of the second portion of the query is dependent on resolution of the first portion of the query; and prioritize resolution of the first portion of the query when the resolution of the second portion of the query is dependent on resolution of the first portion of the query.

\* \* \* \* \*